United States Patent
Hirayama et al.

[19]

[11] Patent Number: 5,903,369
[45] Date of Patent: May 11, 1999

[54] OPTICAL WIRELESS COMMUNICATION METHOD AND APPARATUS

[75] Inventors: Masahiro Hirayama, Ohmiya; Eiichi Nakata, Machida; Kazuhiro Aoyagi, Sagamihara, all of Japan

[73] Assignees: LTEL Corporation, Ohmiya; ITT Canon Co., Ltd., Zama; Showa Electric Wire & Cable Co., Ltd., Kawasaki, all of Japan

[21] Appl. No.: 08/778,282

[22] Filed: Jan. 2, 1997

[30] Foreign Application Priority Data

Jul. 3, 1996 [JP] Japan .................................. 8-192947

[51] Int. Cl.⁶ .................................................. H04J 14/00
[52] U.S. Cl. .......................... 359/118; 359/158; 359/172
[58] Field of Search .................................... 359/118, 158, 359/172

[56] References Cited

U.S. PATENT DOCUMENTS

| | | | |
|---|---|---|---|
| 4,292,626 | 9/1981 | Smithlin | 341/71 |
| 4,905,257 | 2/1990 | Palkert et al. | 341/70 |
| 5,390,039 | 2/1995 | Yamamoto et al. | 359/136 |
| 5,600,471 | 2/1997 | Hirohashi et al. | 359/172 X |
| 5,706,115 | 1/1998 | Hirayama et al. | 359/172 |

*Primary Examiner*—Thomas Mullen
*Attorney, Agent, or Firm*—Oblon, Spivak, McClelland, Maier & Neustadt, P.C.

[57] ABSTRACT

An optical wireless communication method and apparatus that uses Manchester code via a connector connected with a personal computer. The Manchester data from the computer are converted to NRZ transmission data to be temporarily stored and read out. A frame of the read out data is appended with a head leader identifying a sender and end data at the head and end of the frame to be converted to the DMI transmission optical data. The optical data inserted between the head leader and END data are receivable being distinguished from the optical signal of the sender and optical noises. The DMI entitative data removed from the head leader and end data are converted to data of the Manchester code in the reverse course to the sender to be delivered as the Manchester data via a connector. As the optical data with the head leader and end data are distinguishable from the optical signal of the sender and optical noises, high sensitive optical receivers are available.

13 Claims, 14 Drawing Sheets

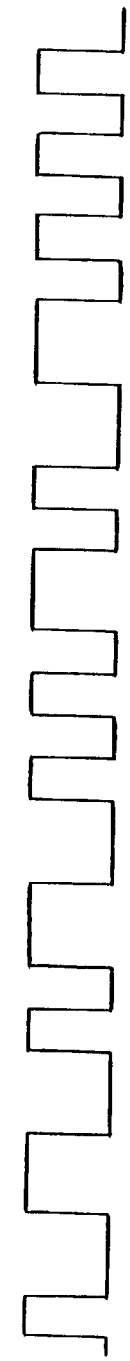
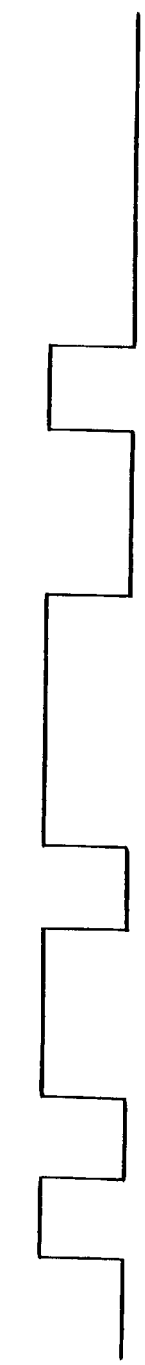
FIG. 4A PRIOR ART ORIGINAL DATA
FIG. 4B PRIOR ART MANCHESTER
FIG. 4C PRIOR ART NRZ
FIG. 4D PRIOR ART DMI

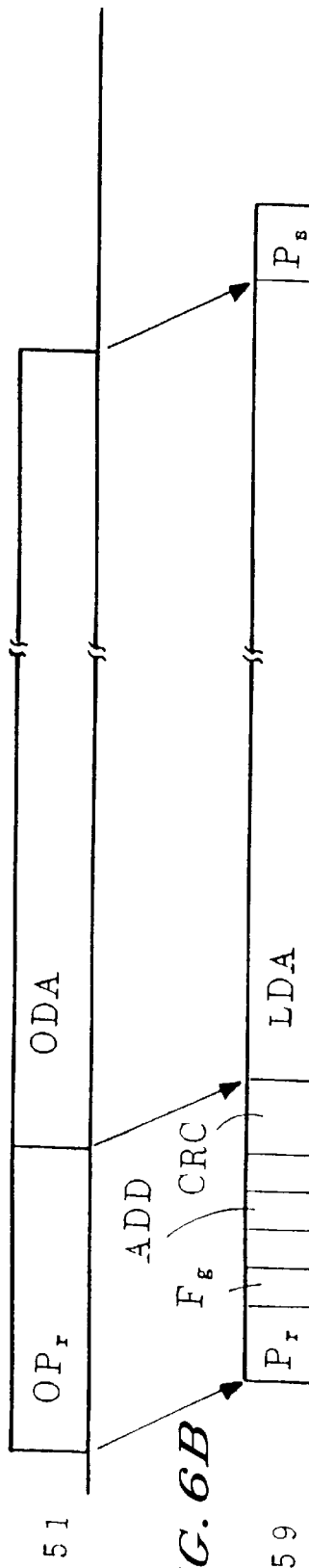
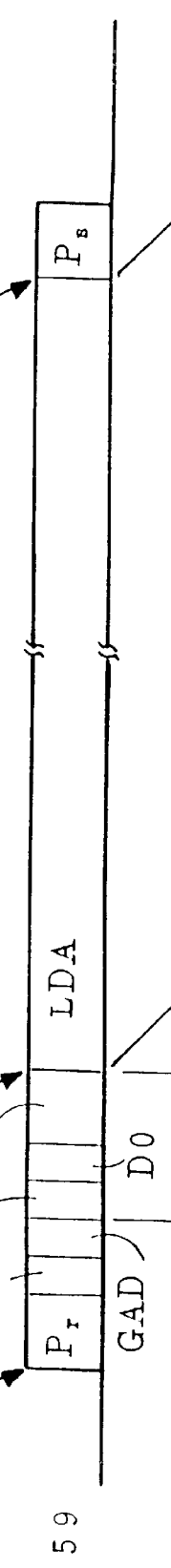
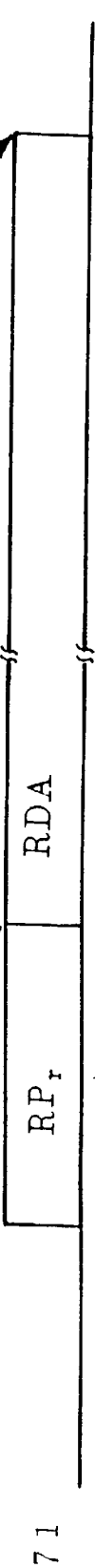
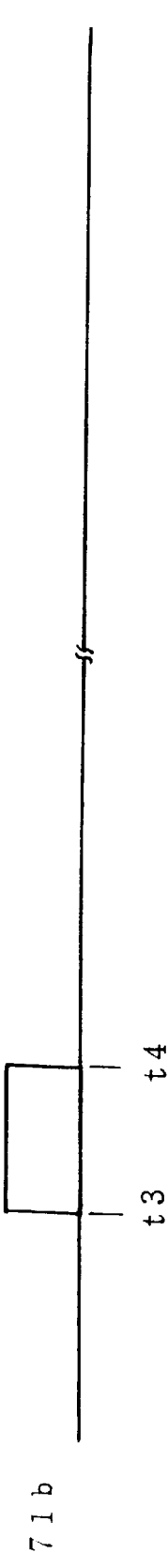

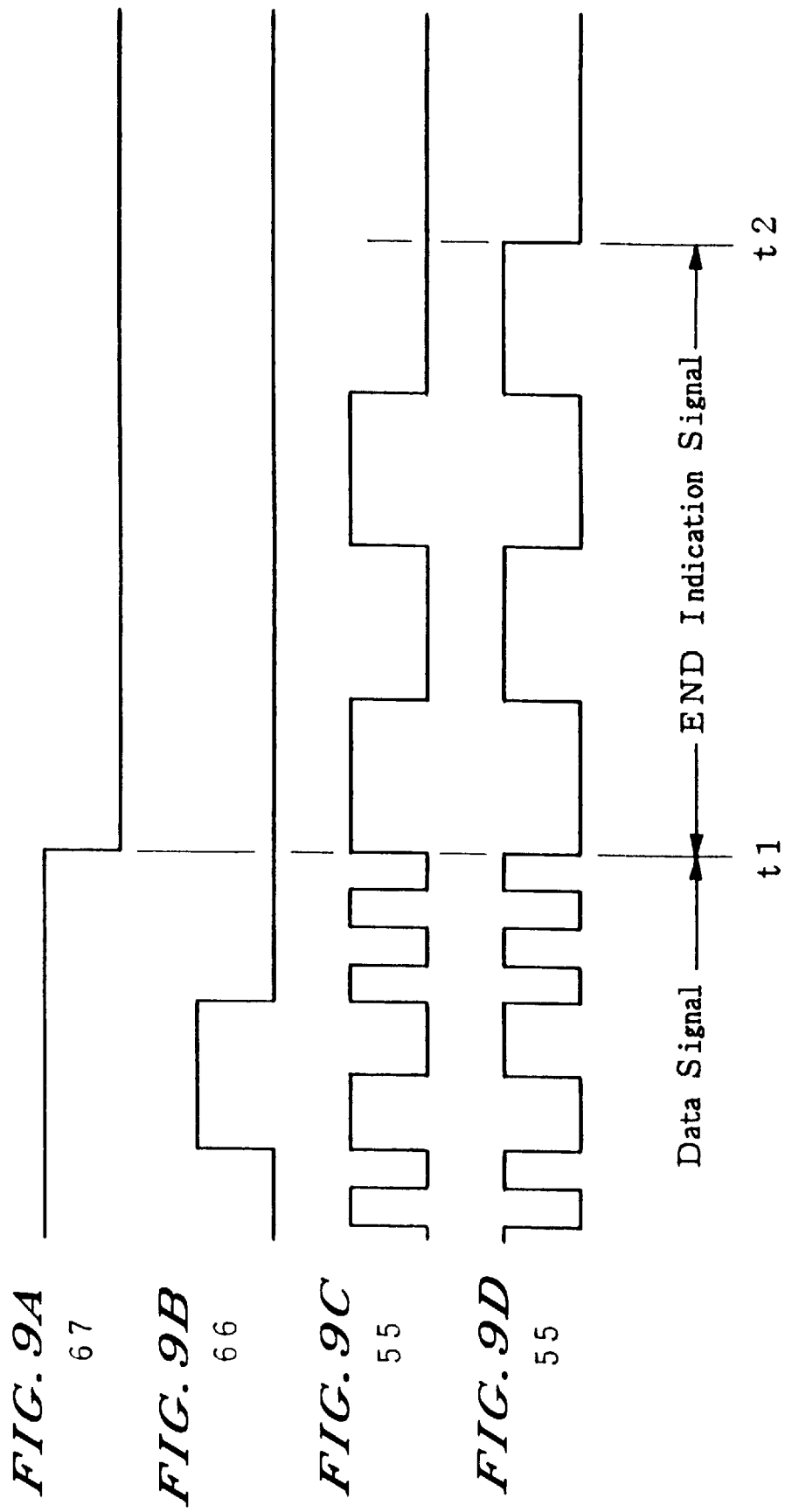

OPTICAL WIRELESS COMMUNICATION METHOD AND APPARATUS

BACKGROUND OF THE INVENTION

1. Field of the Invention

The present invention relates to an optical wireless communication method and apparatus.

The invention is particularly concerned with a method and an apparatus for constructing a local area network (LAN) using optical transmission in space.

2. Description of the Prior Art

Local area networks are employed not only in offices but factories or in the open air for the data communications, because the optical LANs are unaffected by electromagnetic noises.

In the LANs called Ethernet (registered trade mark), a code called a header is appended at the front of the original data to be transmitted. In the header, "10101010" is repeated seven times (seven bytes) and "10101011" indicating the start of the original data is transmitted one time (one byte). Thereafter, the original data are sent out.

There are shown in FIG. 1 internal elements of a prior art optical wireless communication apparatus.

In FIG. 1, there are an optical receiving window 303 to receive optical signals, an optical transmitting window 304 from which the optical signal is transmitted and a connector opening 305. There are printed circuit boards 308 and 310 inside a housing 302.

A photo diode PD and many light emitting diodes LEDs are mounted on the printed circuit board 308. A connector 311 and many parts are mounted on the printed circuit board 310. The optical wireless communication apparatus 300 transmits and receives optical signals of the Manchester code by using the photo diode PD and light emitting diodes LEDs.

There is shown in FIG. 2 an optical wireless communication apparatus 300 connected with a personal computer 320 by a connection cable 315. The personal computer 320 is communicatable with the others by using the optical wireless communication apparatus 300. In the data communication between the apparatus 300 and the computer 320, the Manchester code is used in the same way as the data communication in space.

There are shown in FIG. 3 many pairs of personal computers 320 and optical wireless communication apparatuses 300. The computer 320 can communicate with each other via a satellite 316 fixed on the ceiling 317. Therein the Manchester code is used for multi-accessible data communications.

Many pairs of personal computers 320 and optical communication apparatuses 300 make up an optical wireless LAN. The computers 320 can communicate with each other using the Manchester code.

There are shown in FIG. 4 several kinds of codes. In FIG. 4, (a) indicates an original data to be transmitted to a receiver. FIG. 4 (b) denotes the data encoded from the original data of (a) to the Manchester code called the dipulse code. In the same manner, (c) represents the data encoded from original data of (a) to the NRZ (i.e., nonreturn-to-zero) code, and (d) designates the data encoded from the original data of (a) to the DMI (i.e., differential mode inversion) code.

Each of codes has merits and demerits. The Manchester code is used in the communications between optical wireless communication apparatuses 300 and personal computers 320 in FIG. 3, too, because synchronizing signals are easily detectable. The spectrum of the NRZ code spreads in lower frequency ranges than that of the Manchester or the DMI code. Therefore, the NRZ code is suitable for use in internal circuits of the apparatus. However, the NRZ code is unsuitable for AC amplifying, because the NRZ code has the DC ingredient.

As the DMI and Manchester codes have no DC ingredient, the codes are suitable for AC amplifying. However, when many "1s" or "0s" continue in the DMI and Manchester codes, it is difficult to obtain synchronization signals. Therefore, in case of employing the DMI or Manchester code, some measures are needed to protect occurrences of unsynchronized states. As the Manchester code has no redundancy in its construction, it is difficult to obtain functions of the transmission line watch to prevent occurrences of error data.

In the LAN of FIG. 3, the Manchester code of 10 Mbps, for example, is employed as the optical wireless signals. Therein if one of optical wireless communication apparatuses 300s has high optical receiving sensitivity, the apparatus 300 detects incorrect data by receiving external optical noises in spite of no LAN signal.

Receiving incorrect data, the apparatus 300 can not transmit any optical signal because of the collision avoidance function. As the apparatus 300 has to try the transmission again after no existence of the incorrect data, it is impossible to obtain the high communication efficiency.

Therefore, the optical communications are executable by employing low sensitive optical receivers not to operate the collision avoidance function. By the employing such receivers, wide enough optical LAN service area is unobtainable.

As the number of apparatuses included in the optical LAN service area is reduced by the scale-down of the service area, it is unexpected to obtain the high efficiency and excellent optical data communications.

Let it be supposed that the optical stable communicable distance in a straight line i.e., the mutual distance between optical apparatuses is 10 meters, for instance, the optical energy is reflected at an attenuation rate of 10 percent from the ceiling of the reflection coefficient of 10 percent.

Therefore, the transmittable distance of about 3 meters being the square root of 10 meters is obtained. The distance between the apparatus and the ceiling is limited within 1.5 meters accordingly. The optical apparatus of the communicable straight line distance of 30 meters has to be employed to obtain the effective transmittable distance of 10 meters using the reflection of the ceiling. The directivity of an angle of about +/−20 degrees is needed to obtain some extent of communicable area.

In view of such a situation, however, the optical apparatuses having the directivity of the angle of +/−1 degree, for example, are used to obtain the long distance communications. As those have the sharp optical directivity, the multi-access operation is unexpected. The communication is limited between the specific two apparatuses.

In the optical LAN of FIG. 3, when many apparatuses 300s transmit optical signals simultaneously, the satellite 316 receives collided optical signals. Not detecting the ordinary optical signal, the satellite 316 transmits the collided optical signals to many apparatuses 300 as the received signals. It is therefore, difficult to avoid occurrences of collisions, unless the communication efficiencies are remarkably reduced by the sacrifice of the data bit rate.

In the optical LAN of FIG. 3, the communications use the Manchester code of 10 Mbps. The communications can be occasionally interrupted by the collision avoidance function caused by optical noises, because of a communicable distance that is too short or an optical receiving sensitivity that is too high. It is thereby unexpectable to obtain high efficient optical communications.

In such a case, the measures that the transmission rate of 10 Mbps is reduced to 1 Mbps are executable to get a higher S/N (signal to noise ratio). As the transmission rate is temporally reduced, big capacity memories and complicated controls are needed. They cause high cost.

In a LAN system, each of optical apparatuses granted addresses can efficiently receive only optical frames appended with self-address. The LAN system is disclosed in Japanese Patent Provisional Publication No. 7-23047.

In another LAN system, a network hierarchy includes repeaters connected with optical LANs. The optical LAN frames are appended with hierarchy addresses. The hierarchy system is disclosed in Japanese Patent Provisional Publication No. 7-123052.

SUMMARY OF THE INVENTION

An object of the present invention is to provide a novel optical wireless communication method and apparatus to construct highly reliable and convenient LAN systems. The systems are called the 10 BASE-T or Ethernet (registered trade mark) intercommunicating systems to be usable in offices.

Another object of the present invention is to provide an optical wireless LAN method and apparatus to avoid occurrences of collisions of optical signals from satellites and sender's own optical signals reflected by something.

A further object of the present invention is to provide an optical wireless LAN method and apparatus having a high communication capability by means of avoiding optical collisions between one-to-one or one-to-many apparatuses.

A further object of the present invention is to provide an optical wireless LAN method and apparatus manufacturable with low cost without employing expensive servomechanisms for adjusting optical axes.

A further object of the present invention is to provide an optical wireless LAN method and apparatus, therein the Manchester code is not employed to prevent occurrences of error data, because the Manchester code has no redundancy.

A further object of the present invention is to provide an optical wireless LAN method and apparatus capable of the noise free long distance communications.

A further object of the present invention is to provide an optical wireless LAN method and apparatus having a promoted communication efficiency because when receiving a header of a data frame, a correct signal is immediately detectable.

A further object of the present invention is to provide an optical wireless LAN method and apparatus transmittable an optical signal to a satellite without optical collisions.

A further object of the present invention is to provide an optical wireless LAN method and apparatus multi-accessible in N to N or one to N in the wide area by means of simple controls.

A further object of the present invention is to provide an optical wireless LAN method and apparatus stably synchronizable and rapidly transmittable to keep high communication efficiency by preventing collisions of optical LAN signals and optical noises without large capacity memories for synchronizing with the transmission line.

A further object of the present invention is to provide an optical wireless LAN method and apparatus that effectively distinguishes the optical LAN signal to be received from optical noises without using the Manchester code, because the Manchester code employed between an optical apparatus and computer lacks redundancy.

According to an aspect of the present invention, the Manchester code is employed between the personal computer and the optical wireless communication apparatus of the present invention in the same manner as the prior art. The DMI code is used in the space communication. In the apparatus, the NRZ code converted from the Manchester and DMI codes is used.

The optical wireless communication data of the DMI code in space have the frame structure. In each of frames, instead of a header of an original data to be transmitted, a head leader is used at the frame head. The head leader consists of a preamble data, a flag, a group address designating a satellite and its service area, an inner group address identifying an apparatus, a spare data and a CRC (cyclic redundancy check) code. The post-frame is accompanied with the postamble.

When receiving a frame of data of the Manchester code from the personal computer, a header appended at the head of the frame is removed. The frame of data of the Manchester code removed the header is converted to the frame of data of the NRZ code to be stored in a memory of the apparatus. The head reader including the preamble data and the flag, the group address, the inner group address, the spare data and the CRC code is attached at the frame head instead of the removed header. The postamble is appended to the post-frame.

The frame of data with the head leader and the postamble is converted from the NRZ code to the DMI code to be transmitted as optical data from the optical transmitter of the apparatus. When the optical receiver of another apparatus receives the optical data of the DMI code, the data is converted from the DMI code to the NRZ code. The head leader and the postamble are removed not to be stored in a memory by the reversed manner from the first apparatus.

An apparatus (i.e., sender) transmits an optical signal appended a head leader identifying the sender to a satellite. The satellite sends out the same optical signal as the received optical signal for a wide area of 180 degrees. The sender can immediately detect the self-sent signal by decoding the head leader of the optical signal from the satellite.

When receiving an optical signal except the self-sent signal, the apparatus receives it entirely and does not transmit because another apparatus utilizes the satellite. After the detection of the end of the utilization of the satellite, the apparatus can access the satellite at need. Therefore, optical signals from apparatuses can not be receive at the same time and the probability of optical collisions can be remarkably reduced.

As the apparatus can transmit to or receive from the nearest satellite predetermined by the group address, the apparatus can transmit low optical power signal to avoid receiving the reflected self-sent (sender's own) optical signal. The optical beam to be transmitted can be easy focused to the nearest satellite.

The data of the NRZ code read out from the memory are converted to the Manchester code to be sent to the personal computer connected with the second apparatus. As in the apparatus the NRZ code is used, and a small memory capacity of data is needed, because the data rate of the NRZ code, including spectrum of low frequency range, is not rapid. So the simple data processes are usable.

In the optical data frame, the head leader and the postamble are provided at its head and end, respectively. Therefore, data with no head leader and no postamble or with the self-address indicating the signal sent by its own self can be easily detected as noises. The optical wireless LAN having a wide communicable area can be easily constructed, because the apparatuses have the function of protecting from optical noises and have the high optical sensitivity.

The data of the Manchester code are employed between the personal computer and apparatus in the same manner as that of the prior arts. Therefore, the interchangeability between prior art equipments using the Manchester code is kept with no trouble.

Received data errors can be detected by the CRC code included the head leader. When data errors detected, the subsequent receiving procedures are discontinued. Then the new following receiving procedures can be started. So high efficiency receiving capabilities are obtainable.

BRIEF DESCRIPTION OF THE DRAWINGS

The principle, construction and operation of the present invention will be clearly understood from following detailed description taken in conjunction with the accompanying drawings, in which:

FIG. 4 is a time chart showing the original data converted to the Manchester code, the NRZ code and the DMI code in accordance with the prior art;

FIG. 6 is a time chart of frames in various portions of the apparatus for showing the principle in accordance with the present invention;

FIG. 9 is a time chart showing "END" indication signal in accordance with the present invention;

DESCRIPTION OF THE PREFERRED EMBODIMENTS

The present invention will be described herein under in detail with reference to the accompanying drawings.

Figure 5:
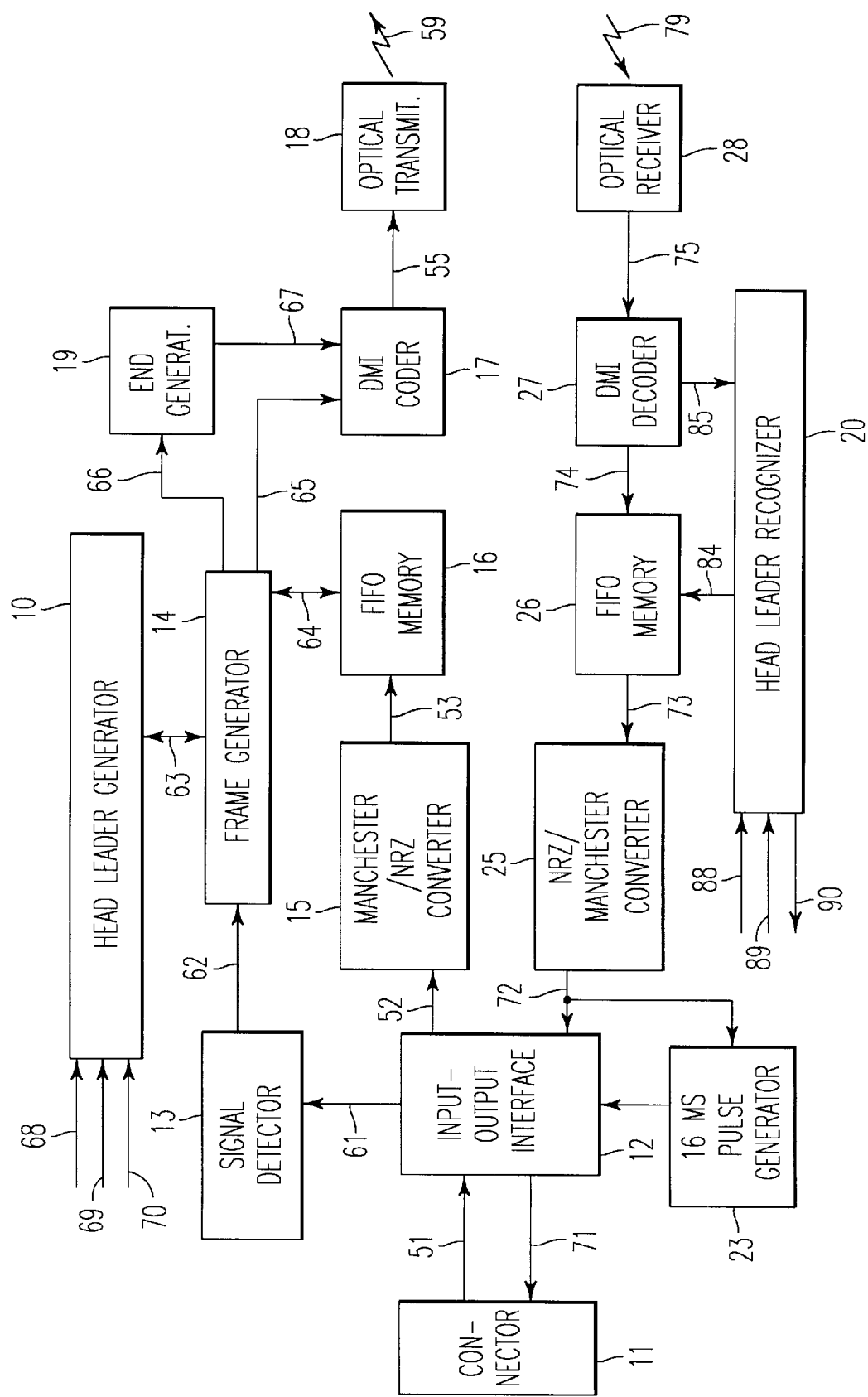
FIG. 5 is a block diagram of an optical wireless communication apparatus in accordance with the present invention.

FIG. 5 shows an embodiment of the present invention constructed as an optical wireless communication apparatus.

A reference numeral 11 denotes a connector called the 10 BASE-T standardized by the IEEE 802.3 LAN specification.

Figure 1:
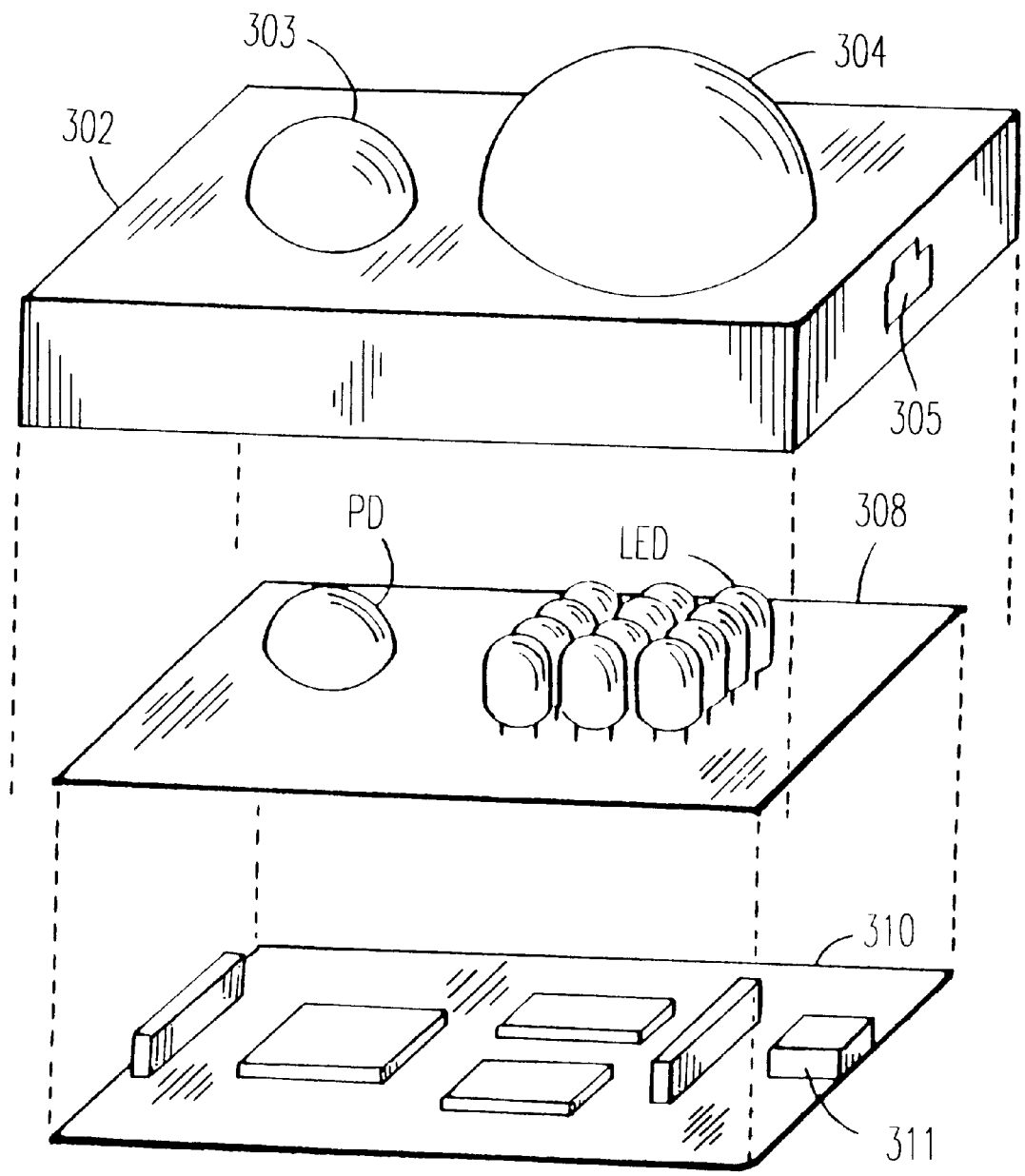
FIG. 1 is an exploded view in perspective of an optical wireless communication apparatus of the prior art.
Figure 2:
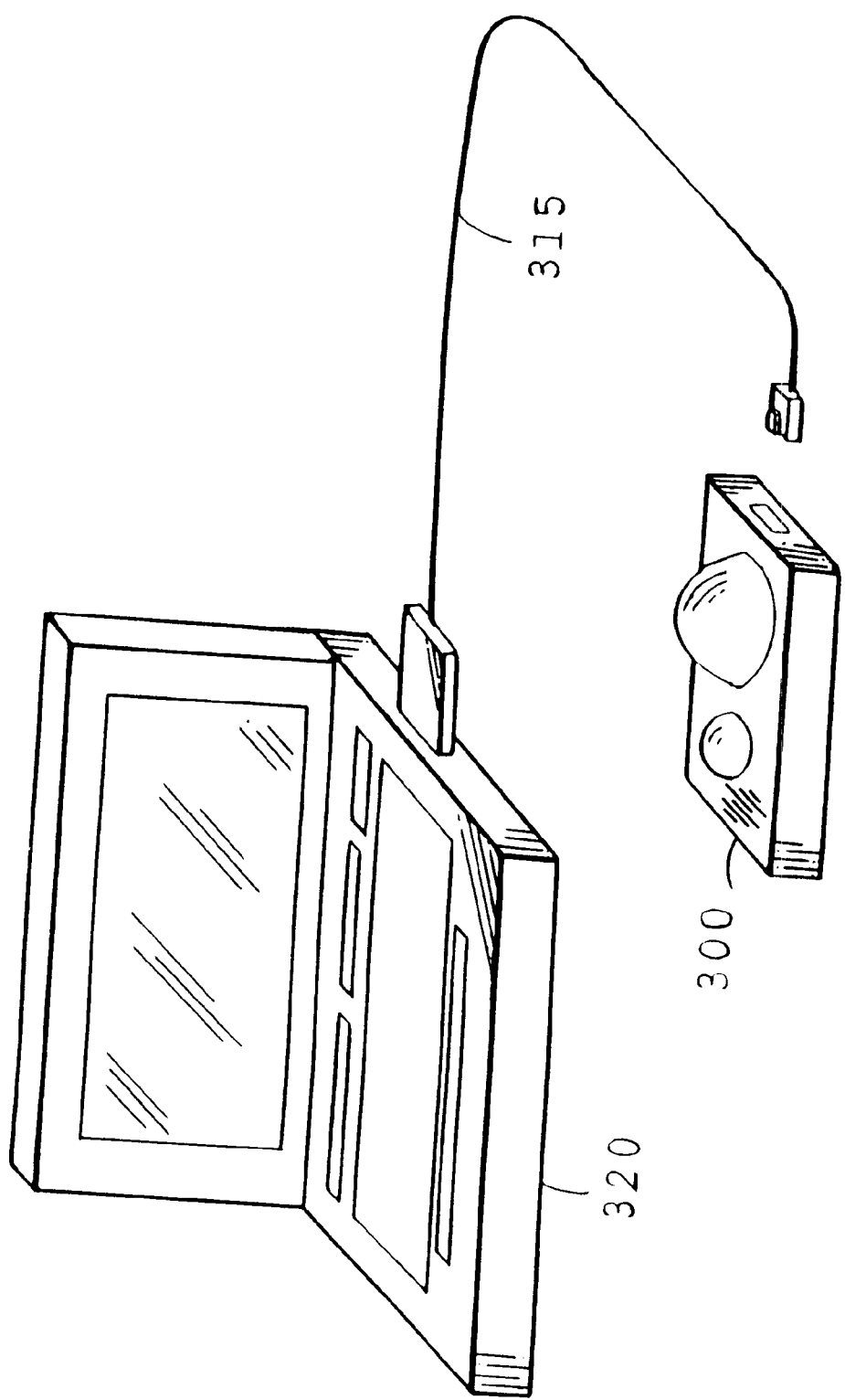
FIG. 2 is a perspective illustration of the apparatus connected with the personal computer in accordance with the prior art.
Figure 3:
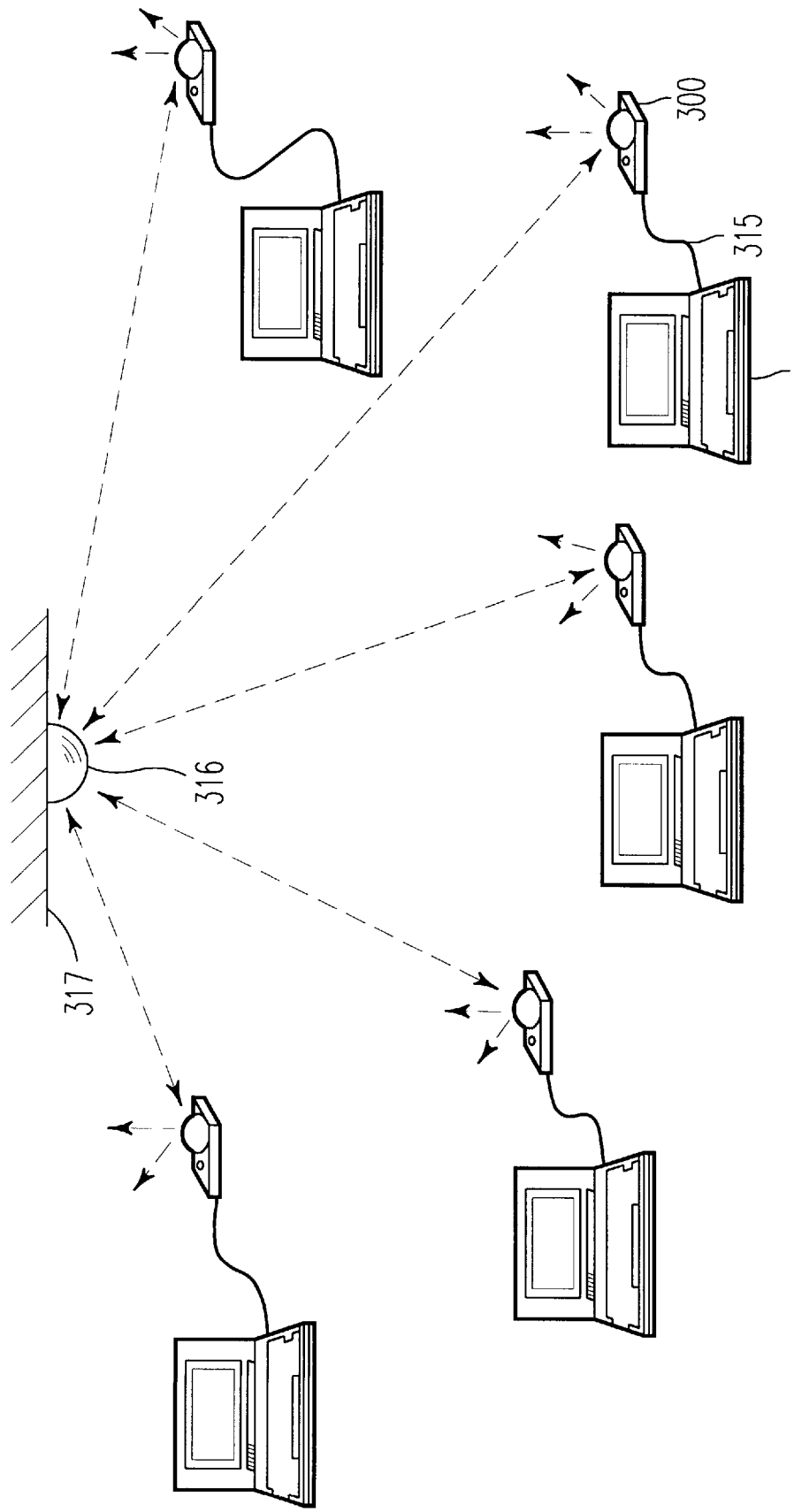
FIG. 3 is a schematic illustration of many apparatus communicating by multi-accessing via a satellite fixed at the ceiling in the accordance with the prior art.

The connector 11 is the same as the connector 311 in FIG. 1. Namely, a personal computer 320 of FIG. 2 is connected with an input-output interface 12 through the connector 11 with a cable 315 of FIG. 2. The data of signals 51 and 71 between connector 11 and the interface 12 are expressed by the Manchester code of FIG. 4 (b).

A signal detector 13 receives the signal 61 from the interface 12. The signal 61 represents the same data as that of the LAN signal 51 of the Manchester code according to the prior art. When detecting the Manchester code signal in the signal 61, the signal detector 13 sends the signal 62 to the frame generator 14.

Responding to the signal 63 from the frame generator 14, the head leader generator 10 generates an optical transmission head leader to send out it to the frame generator 14 by the bi-directional signal 63.

Receiving the signal 62, the frame generator 14 recognizes an original preamble appended to the head of an original data in the signal 51. Then the frame generator 14 instructs a FIFO (first-in, first-out) memory 16 by means of a bi-directional signal 64 to memorize the original data only.

The head leader generator 10 is externally set a group address 68, an inner group address 69 and an external set data 70 at need from the outside. The group address 68 is an address of a satellite 316 or its service area. The inner group address 69 identifies an apparatus 300 in the service area. The external set data 70 is a data to be written into an optical transmission signal as a preamble data.

When receiving a Manchester code signal 52 from the interface 12, a Manchester/NRZ converter 15 converts the Manchester code signal 52 to the NRZ signal 53 (refer to FIG. 4 (c)). The original data of the NRZ signal 53 is temporarily memorized in the FIFO memory 16. The data frame generator 14 reads out the memorized NRZ data from the FIFO memory 16 by using the bi-directional signal 64.

The frame generator 14 sends out the head leader from the head leader generator 10 and the NRZ data from the FIFO memory 16 as a signal 65 to a DMI coder 17 in series. When the NRZ data at which head the head leader was appended were sent out, the timing is fed to an END generator 19 by using a timing signal 66. Then the END generator 19 generates an END data to be sent to a DMI coder 17 by using a signal 67.

In the DMI coder 17, the END data indicating the frame end are attached at the end of the frame of the NRZ data at which head the head leader is appended. And the NRZ data are coded to the DMI data. Then the DMI coder 17 sends out the DMI signal 55. The DMI signal 55 is fed on an optical transmitter 18 to transmit into space in a direction of the satellite 316 as an optical transmission signal 59. The optical transmitter 18 includes one or more LEDs (refer to FIG. 1). The DMI optical transmission signal 59 is transmitted through the optical transmitting window (refer to 304 of FIG. 1).

Receiving an optical receiving signal 79 sent via the satellite 316 from the other side as the optical transmission signal 59, an optical receiver 28 sends out a DMI signal 75 to a DMI decoder 27. The DMI decoder 27 decodes the DMI signal 75 to NRZ signals 74 and 85. The NRZ signal 74 is added to a FIFO (first-in, first-out) memory 26 and the NRZ signal 85 is added to a head leader recognizer 20.

The head leader recognizer 20 is externally preset a group address 88 and an inner group address 89 which are the same as the group address 68 and the inner group address 69. When receiving the signal 85, the head leader recognizer 20 recognizes the group address and the inner group address of the signal 85 by comparing with its (i.e., the sender's) own address (i.e., ID number) preset by external set addresses 88 and 89.

When the address of the signal 85 was not recognized as its (i.e., the sender's) own address, the head leader recognizer 20 detects the head leader and the END data in the NRZ signal 85. Then the head leader at the top and the END data at the end of the frame are taken away from the NRZ signal 74 to obtain one frame of the entitative data according to instructions of the signal 84.

The entitative data are added to a FIFO memory 26 to be temporally memorized. The FIFO memory 26 sends out a NRZ signal 73 to a NRZ/Manchester converter 25 according to instructions of the signal 84. External preliminary data 90, which are the same data that of the signal 85 including the head leader and the END data, are obtainable at need. In the signal 85, data with neither the head leader nor the END data and with the sender's own address can be regarded as noise and does not to have to be treated.

Receiving the NRZ signal 73, the NRZ/Manchester converter 25 converts the NRZ data of the signal 73 to the data of the Manchester code. As the head of the data of the Manchester code, a reproduced preamble is appended. The reproduced preamble is the same code that of the original preamble. The NRZ/Manchester converter 25 delivers the Manchester data with the preamble as a Manchester signal 72 to the connector 11 as a signal 71 via the interface 12. In view of the connector 11, the both signals 51 and 71 are represented by the Manchester code, and so it seems that the signals 51 and 71 are the same signals as those of the prior art LAN. Accordingly, the exchangeability or connectability to conventional devices using the Manchester code is kept.

The Manchester signal 72 is applied to a 16 ms pulse generator 23, too. When a period of nonexistence of the Manchester signal 72 is over 16 ms, the 16 ms pulse generator 23 generates pulses of 100 ns width at 16 ms +/−8 ms intervals to send out as the signal 71. Thereby the CCITT (The International Telegraph and Telephone Consultative Committee) recommendations are satisfied.

It is obvious that the both Manchester signal 51 and 71 are directly connectable to many kinds of devices or transmission lines using the Manchester code without using the connector 11 in FIG. 5.

FIG. 6 illustrates frame constructions to show the principle of the present invention. A frame of the original data ODA, at which head an original preamble OPr is appended, to be transmitted by the Manchester signal 51 is shown in FIG. 6 (*a*).

The original preamble OPr is called a header. In the header, "10101010" is repeated seven times (seven bytes) and "10101011" indicating the start of the original data ODA is transmitted one time (one byte).

The original data ODA of the Manchester signal 51 are converted to those of the NRZ code, in which the head leader and the END data are appended to the data of the DMI code and transmitted to space as the optical transmission signal 59 as shown in FIG. 6 (*b*).

The head leader consists of a preamble data Pr, a flag Fg, a group address GAD, an inner group address ADD, a spare data DO and a CRC code. The END data is represented by the postamble Ps. The preamble data Pr are variable-length data in which "1s" of three to several tens bytes continue in sequence. The flag Fg includes a flag data of one byte.

The group address GAD of one byte designates an identity of a satellite communicatable with the apparatus. The inner group address ADD of one byte identifies the apparatus. The spare data DO of one byte is a simple comment data. Two bytes of the inner group address ADD of one byte and the spare data DO of one byte are usable for the extension of the inner group address ADD or the spare data DO at need.

The CRC (cyclical redundancy) code of two bytes is usable for detecting and correcting errors of data. The CRC code is based on the recommendations of the CCITT-16 (The International Telegraph and Telephone Consultative Committee). The postamble Ps of one byte following the optical LAN data LDA is the END data representing the end of the frame. The END data are exhibited by two cycle square waves of which cycle period is four times that of the shortest DMI code.

The frame of the optical transmission LAN data is appended the head leader and the post amble Ps at the head and end of it. Therefore, when received, the optical LAN data are easily discriminatable from the self-sent optical signal (sent out by itself (i.e., by the sender)) and optical noises.

The discriminated optical DMI LAN data, which are put between the preamble data Pr, flag Fg, group address GAD, spare data DO, CRC code and the postamble Ps as shown in FIG. 6 (*b*), are converted to the NRZ data to be stored. The stored NRZ data are converted to the reproduced Manchester data RDA with a reproduced preamble RPr at its head to obtain the Manchester signal 71 as shown in FIG. 6 (*c*). The reproduced preamble RPr is the same code that of the original preamble OPr. Thus the Manchester signal 71 of (c) is the same signal as the Manchester signal 51 of (a) in FIG. 6.

When are detected by using the CRC code in the head leader recognizer 20, an aspect of the signal 71 is shown as a signal 71*b* in FIG. 6 (*d*). At the timing t3, being the end of the group address GAD, the reproduced preamble RPr starts to be transmitted as shown in (c). However, when errors are detected at the receiving end timing t4 of the CRC code, the transmission of the reproduced preamble RPr is interrupted as FIG. 6 (*d*). By the interruption, the head leader recognizer 20 is receivable following optical signals.

Figure 7:
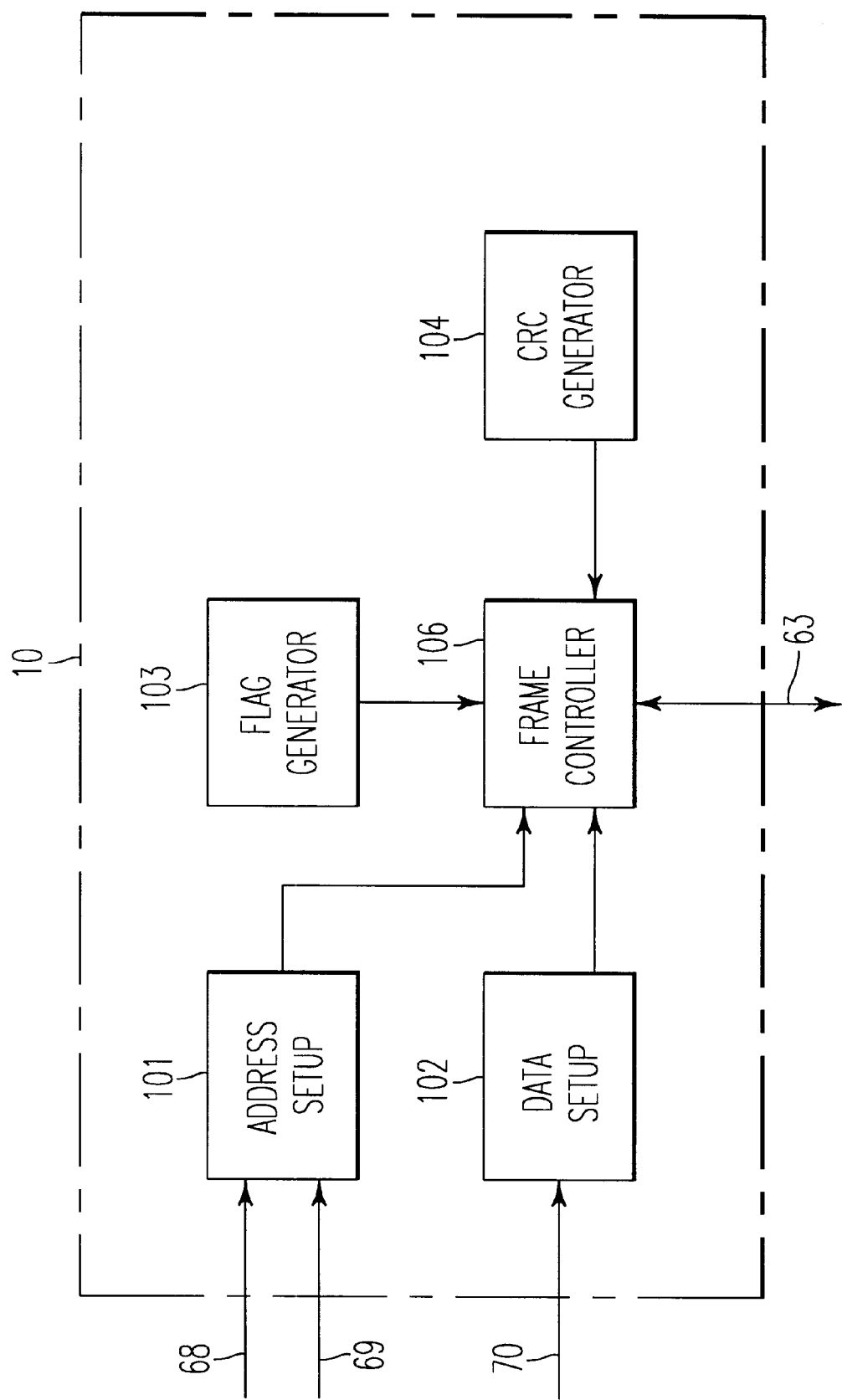
FIG. 7 is an internal block diagram of a head leader generator included in the apparatus of FIG. 5 in accordance with the present invention.

FIG. 7 illustrates the internal construction of the head leader generator 10. The group address 68 and the inner group address 69 are fed to an address setup 101 to be sent out to a frame controller 106. The group address 68 designates the satellite communicable with its own self. The inner group address 69 identifies its own self.

Receiving the external set data 70 to be the preamble data Pr, a data setup 102 feeds the preamble data Pr to the frame controller 106. A flag generator 103 generates the flag Fg to be sent to the frame controller 106. A CRC generator 104 generates the CRC code to deliver to the frame controller 106. Receiving the bi-directional signal 63, the frame controller 106 sends out the head leader as the signal 63.

Figure 8:
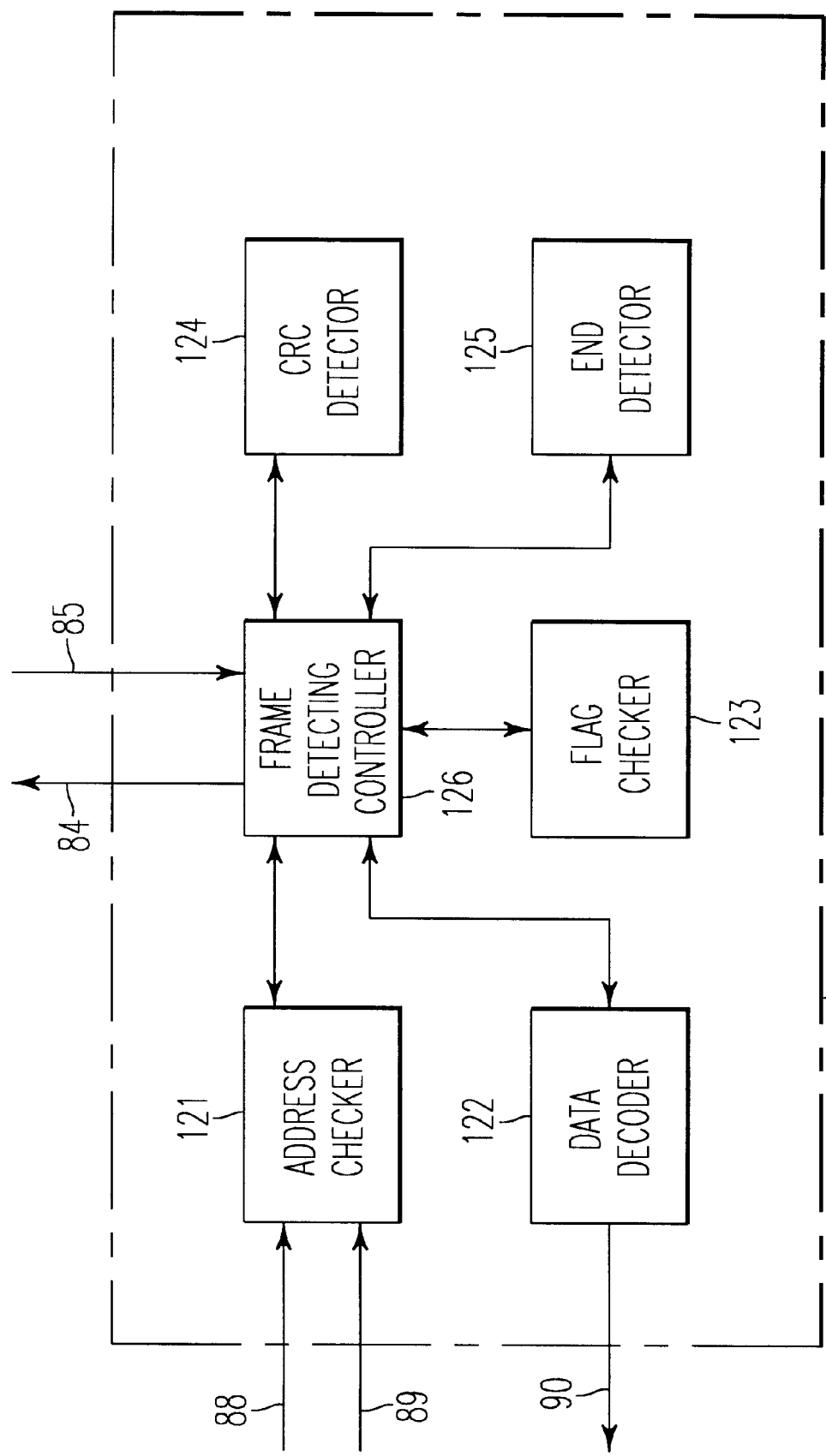
FIG. 8 is an internal block diagram of a head leader recognizer included in the apparatus of FIG. 5 in accordance with the present invention.

FIG. 8 shows the internal construction of the head leader recognizer 20. An address checker 121 is preset the group address 88 and the inner group address 89. The group address 88 and the inner group address 89 are the same data those of the group address 68 and the inner group address 69, respectively.

The address checker 121 checks to make sure that a received data address of a signal 85 coincides with its own address or not. When checked to make sure of the received address of the signal 85 coinciding with its own address or not, the address checker 121 informs of the checked matter to a frame detecting controller 126.

The data decoder 122 receives the receiving data via the frame detecting controller 126 applied the signal 85. The data decoder 122 decodes receiving data of the DMI code to the NRZ data to send out as the external preliminary data 90 at need.

A flag checker 123 checks the contents of the flag Fg, the group address GAD, the inner group address ADD and the spare data DO with the exception of the CRC code of the signal 85 added to the frame detecting controller 126. When the group address GAD is coincident with its own group address 88 and the inner group address ADD is not coincident with its own inner group address 89, the signal 85 is to be receive, because the signal 85 is not the self-sent signal, nor optical noises.

Then the flag checker 123 informs the frame detecting controller 126 that the receiving data signal 85 is to be received. A CRC detector 124 detects the CRC code of the signal 85 added to the frame detecting controller 126. The CRC detector 124 inspects for receiving data errors. The CRC detector 124 informs the frame detecting controller 126 of the inspected results.

An END detector 125 detects the END data shown as the post amble Ps of FIG. 6 (b) at the end of the frame. The END data indicates the end of the receiving data of the signal 85 provided for the frame detecting controller 126. Then the END detector 125 informs the frame detecting controller 126 of the detected matter.

When received informations from the address checker 121, flag checker 123, CRC detector 124 and END detector 125, the frame detecting controller 126 controls the data (corresponding to the optical LAN data LDA of the signal 59 of FIG. 6 (b)) to be stored into or read out from the FIFO memory 26 by using the signal 84.

FIG. 9 shows an operating aspect of the END generator 19 and DMI coder 17 sending out the frame END indication signal as the postamble Ps at the end of the frame to be transmitted. Output and input signals 67 and 66 of the END generator 19 are indicated in FIGS. 9 (a) and (b). In the two cases, output signals 55s of the DMI coder 17 are shown in FIGS. 9 (c) and (d).

In FIG. 9 (b), the END generator 19 detects the end of the NRZ data signal 66 at a point of time t1, and so the signal 67 of (a) indicating a "H" state changes to an "L" state. The same NRZ data signal 65 that of the signal 66 is applied to the DMI coder 17. The NRZ data signal 65 is coded to the data signals 55s of the DMI code shown in FIG. 9 (c) or (d). The data signal (c) or (d) is obtainable depending upon the state of "H" or "L" of the data signal 55 at the t1.

At the t1, the signal 67 of (a) is changed "H" to "L", and then the DMI coder 17 delivers an END indication signal ended at a point of time t2 as shown in FIG. 9 (c) or (d). The END indication signal is fixed to the "L" state at the t2. The END indication signal consists of two cycles of square waves having a cycle time of four times as long as the shortest cycle time of the data signal.

Figure 10A:
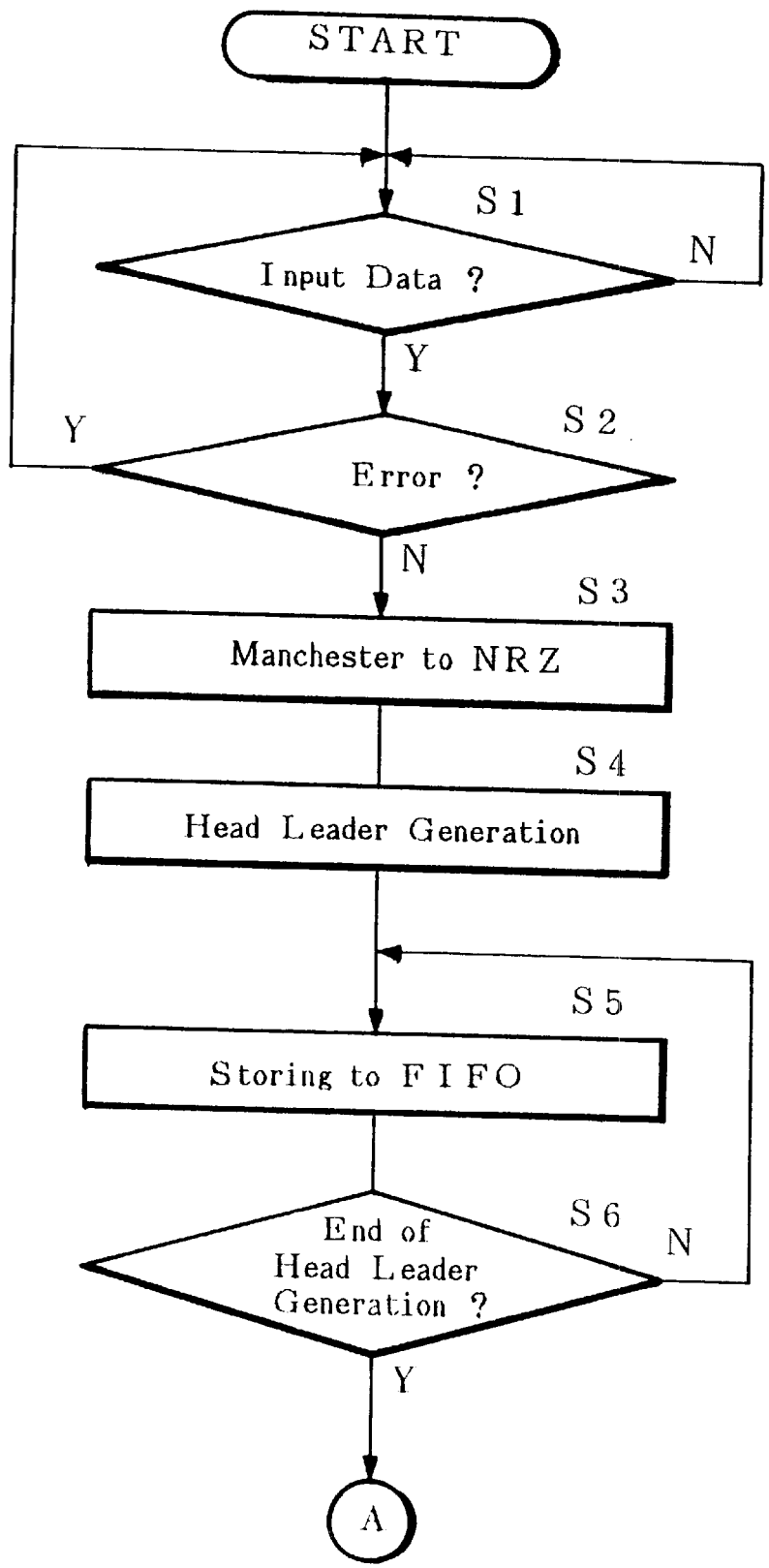
FIGS. 10A and 10B are flowcharts of the operation flow of the frame generator included in the apparatus of FIG. 5 according to the present invention.
Figure 10:
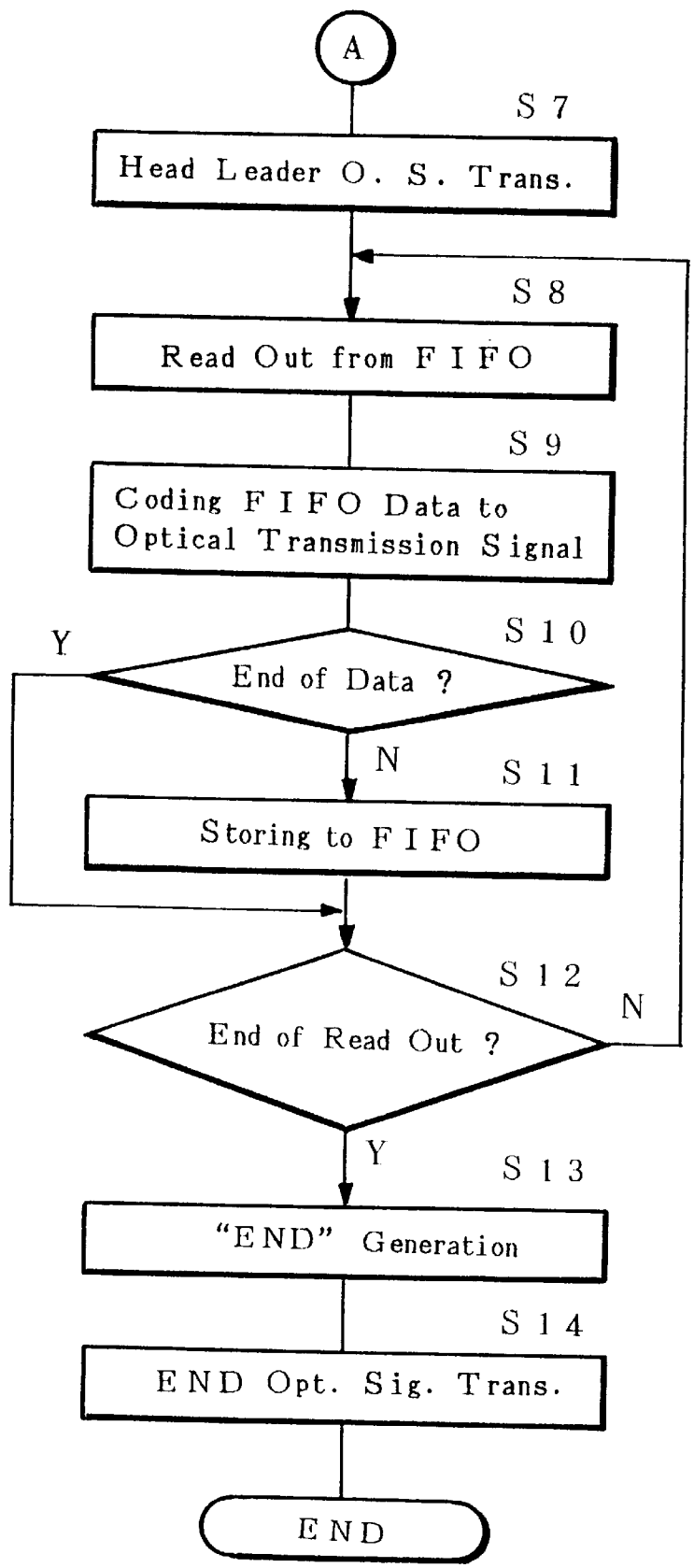

FIGS. 10A and 10B show in combination the operation flow of the frame generator 14. When the operation is started, the frame generator 14 is informed by the signal 62 that the input of the data of the Manchester code from the connector 11 is applied to the frame generator 14 (S1Y, FIG. 10). When informed from the head leader generator 10 including the CRC generator 104 that errors occurred in the input data by using signal 63, the operation step of the frame generator 14 is returned to the step S1 (S2Y).

When no error (S2N), the Manchester data signal 52 is converted to the NRZ data signal 53 (S3). The head leader to be appended at the head of the frame of the NRZ data is generated by the head leader generator 10 (S4). The NRZ data of the signal 53 are stored in the FIFO memory 16 (S5). The storing operation is continued until the end of the head leader generation (S6N).

At the end of it, the frame generator 14 receives the head leader from the head leader generator 10 (S6Y). So the head leader optical signal is transmitted into space (S7, FIG. 10B). The head leader optical signal consists of the preamble Pr, flag Fg, group address GAD, inner group address ADD, spare data DO and CRC code as shown in FIG. 6 (b).

Then the frame generator 14 reads out the stored matter from the FIFO memory 16 (S8). The operation storing the data into the FIFO memory 16 is continued until the end of the frame of the data in spite of the continuation of the read out operation and the operation coding FIFO data to the optical transmission signal (S9, S10, S11, S12).

Confirming the end of the operation reading out the contents of the FIFO memory 16 (S12Y), the END generator 19 generates the signal 67 representing the END data Ps of FIG. 6 (b) (S13). Then the DMI coder 17 sends out the END data. The END data is appended at the end of its frame to construct the frame of the DMI code. The frame is transmitted to space as the optical transmission signal 59 as shown in FIG. 6 (b), and the operation transmitting the frame ends (S14).

Figure 11A:
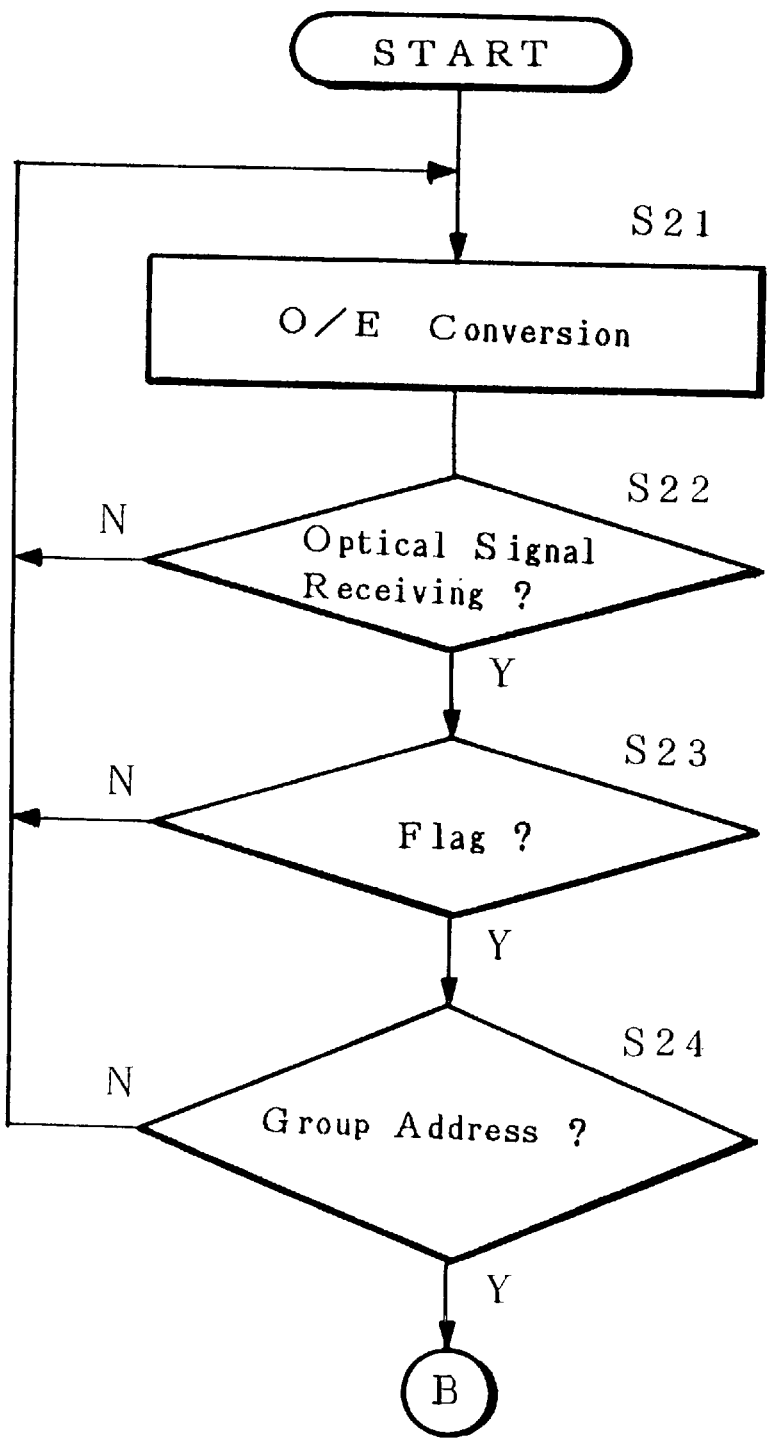
FIGS. 11A and 11B are flowcharts of the receiving operation flow in the apparatus of FIG. 5 according to the present invention.
Figure 11B:
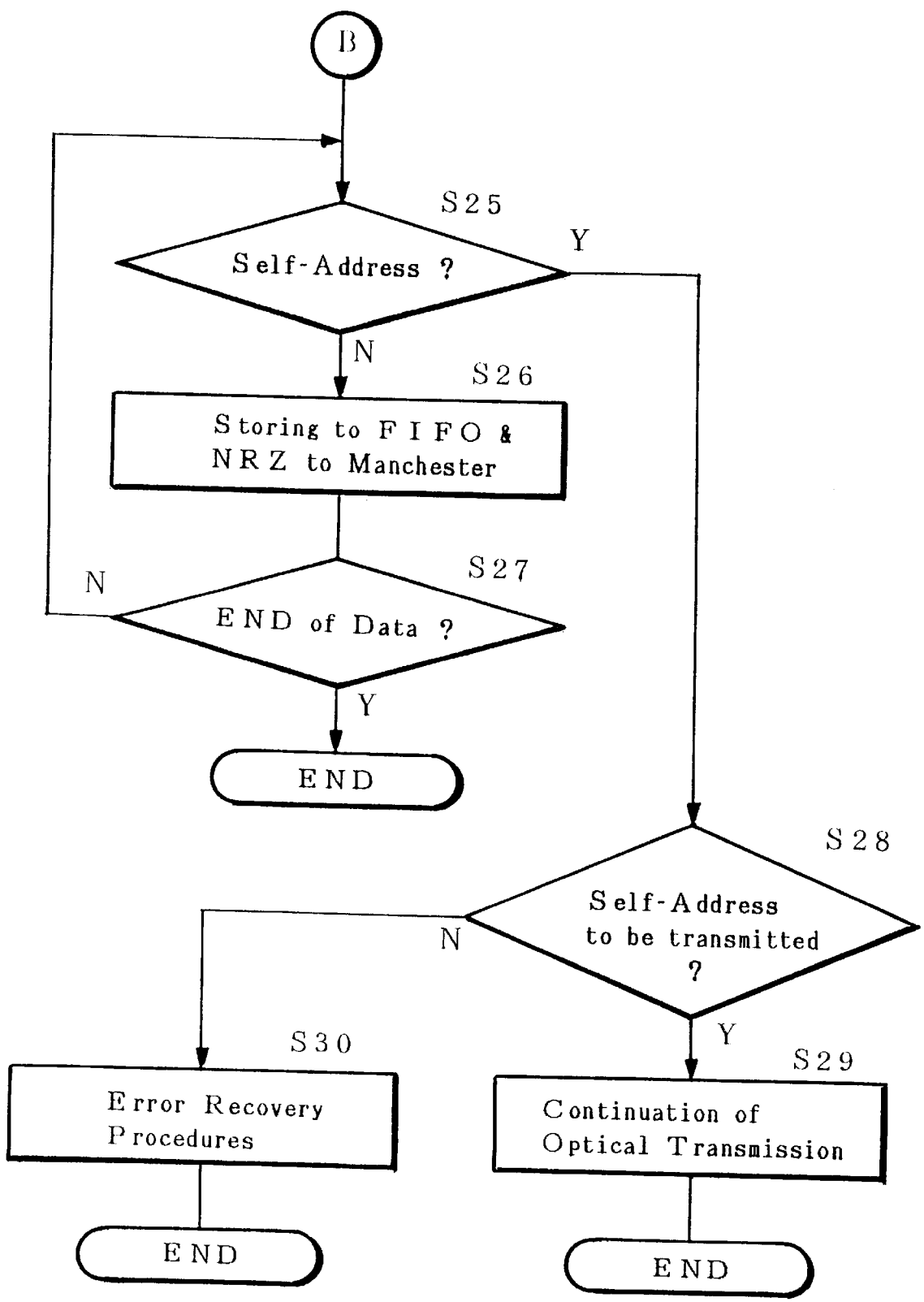

FIGS. 11A and 11B show in combination the flow of the operation receiving an optical signal. The optical receiver 28 converts an optical signal 79 to an electric DMI signal 75 (S21, FIG. 11A). The DMI decoder 27 decodes the DMI signal 75 to NRZ signals 74 and 85. Receiving the NRZ signal 85, the head leader recognizer 20 can recognize receiving the optical signal (S22Y).

The head leader recognizer 20 recognizes a flag Fg following a preamble Pr at the head of the frame (S23). When recognized (S23Y), the head leader recognizer 20 recognizes that a group address GAD coincides with its own group address or not.

When recognized the coincidence (S24Y), it is checked that an inner group address ADD coincides with itself (i.e., sender) own or not (S25, FIG. 11B). When checked the incoincidence (S25N), it is confirmed by the head leader recognizer 20 that the optical signal 79 is to be received because the optical signal 79 is not transmitted by itself (i.e., sender) own (S25N).

Then the NRZ signal 74 corresponding to the optical LAN data LDA of FIG. 6 (b) is fed to the FIFO memory 26 from the DMI decoder 27 to be stored. And the NRZ stored matter is converted to obtain the Manchester signal 72 under controls of the head leader recognizer 20 (S26). Detecting the postamble Ps, the END of the data of the Manchester signal 72 is confirmed and the receiving operation is ended (S27Y).

In the operation of the step S25, when a received inner group address ADD coincides with its own self (S25Y), the head leader recognizer 20 recognizes that the optical receiving signal 79 is its own optical transmission signal relayed by the satellite or reflected by something. So, it is checked whether the optical signal appended with the self-address has to be transmitted or not (S28). When decided to be transmitted (S28Y), the optical transmission is continued (S29). When decided not to be transmitted (S28N), the received optical signal is not to be treated thereafter and the error recovery procedures for noises are executed (S30).

Figure 12A:
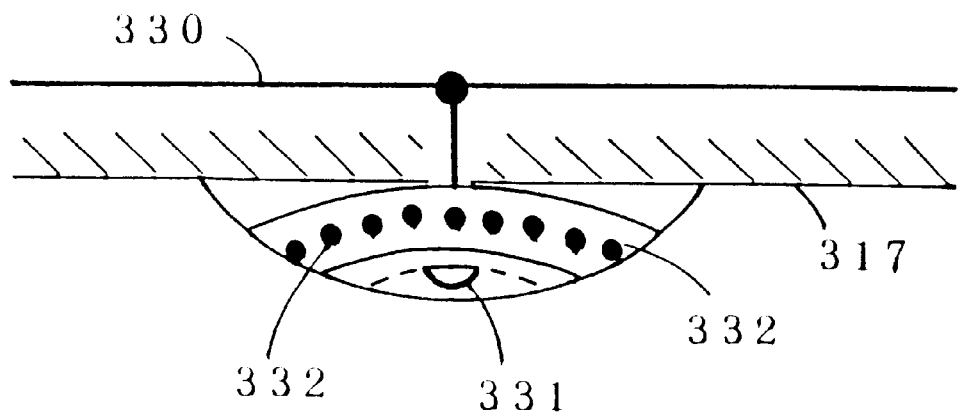
FIG. 12 is a side view and a looking upward view of a satellite in accordance with the present invention.
Figure 12B:
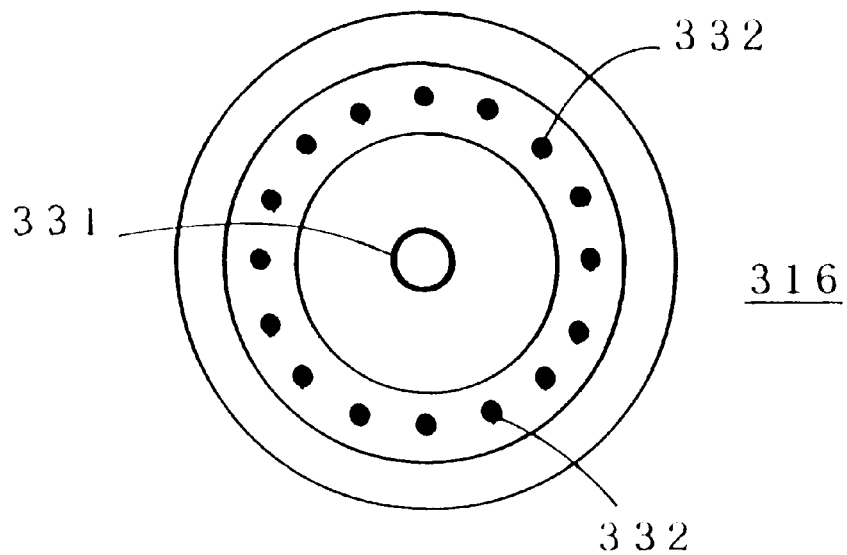

FIGS. 12 (a) and (b) are a side view and a bottom view of a satellite 316. The satellite 316 connected with a LAN cable 330 is attached to a ceiling 317. Many light emitting diodes 332 are arranged. At the center of those, a wide range optical receivers 331 is posted not to directly receive lights from those diodes 332.

As will be clear from the foregoing description, the operation of the present invention has the following merits:

1) As the optical LAN data of the DMI code are transmitted with the head leader at its head and the END data at its end, the transmitted correct data are exactly receivable in distinction from self-sent optical signal (sent out by itself (i.e., sender)) and optical noises.

2) High sensitive optical receivers are employed to obtain long transmission distances, wide optical serviceable area resulted from wide directivities. Rapid rate data are transmittable without deteriorations from self-sent optical signals and optical noises, because error signals are detectable at an early stage.

3) As possibilities of the optical LAN data collisions are remarkably reduced by reliably distinguishing the optical LAN data to be received from self-sent optical signals and optical noises, the functions of the CSMA/CD (Carrier Sense Multiple Access with Collision Detection) standardized by IEEE 802.3 can be obtained.

While the invention has been described in its preferred embodiments, it is to be understood that within the scope of the appended claims, the invention may be practiced otherwise than as specifically described.

What is claimed is:

1. An optical wireless communication method comprising the steps of:

converting transmission data of a Manchester code to data of a nonreturn-to-zero (NRZ) code so as to obtain NRZ transmission data, storing temporarily said NRZ transmission data so as to obtain a stored NRZ transmission data, detecting said transmission data of the Manchester code to obtain a data detection signal, generating a head leader identifying a sender thereof wherein said head leader is used for distinguishing an optical signal to be received from optical noises and said sender's optical signal not to be received, generating a frame of NRZ data appended to said head leader on the head of said stored NRZ transmission data at a timing of said data detection signal, and an NRZ data end timing signal at an end of said frame of NRZ data, generating end data at a timing of said NRZ data end timing signal, coding said frame of NRZ data to data of a differential mode inversion (DMI) code so as to obtain a DMI transmission frame appended with said end data at an end thereof, transmitting an optical transmission signal of the DMI code to space when said DMI transmission frame is provided, receiving an optical receiving signal of the DMI code so as to obtain DMI receiving data appended with a head leader and end data at a head and end thereof, respectively, decoding said DMI receiving data to data of the NRZ code so as to obtain NRZ receiving data appended with the head leader and end data at the head and end thereof, respectively, recognizing said NRZ receiving data from the head leader and end data for distinguishing from said sender's own optical signal not to be received and optical noises so as to obtain a recognizing signal, memorizing said NRZ receiving data temporarily so as to obtain memorized NRZ data (73) on a first-in first-out basis, according to an instruction of said recognizing signal, and converting said memorized NRZ data to data of the Manchester code so as to obtain Manchester receiving data.

2. An optical wireless communication method according to claim 1, wherein said head leader includes a preamble data, in which a predetermined number of "1s" continue in sequence, a flag, a group address, an inner group address for identifying the sender and a cyclic redundancy check (CRC) code for detecting and correcting errors.

3. An optical wireless communication method according to claim 1, wherein said recognizing signal of the recognizing operation can not be obtained when said sender's optical signal is detected in said head leader.

4. An optical wireless communication method according to claim 2, wherein said recognizing signal of the recognizing operation can be obtained only when said sender's group address is detectable and said sender's inner group address is undetectable in said head leader.

5. An optical wireless communication method according to claim 1, wherein the end data generating step comprises generating said end data which consists of two cycles of square waves having a cycle time of four times as long as a shortest cycle time of a data signal of said DMI transmission frame of the coding operation.

6. An optical wireless communication method according to claim 2, wherein said recognizing signal of the recognizing operation instructs the memorizing operation not to memorize said NRZ receiving data when an error signal is detected by using the CRC code.

7. An optical wireless communication apparatus comprising:

Manchester to nonreturn-to-zero (NRZ) converting means for converting transmission data of a Manchester code to data of an NRZ code so as to obtain NRZ transmission data, storing means for storing temporarily said NRZ transmission data so as to obtain a stored NRZ transmission data, detecting means for detecting said transmission data of the Manchester code to obtain a data detection signal, head leader generating means for generating a head leader identifying a sender thereof wherein said head leader is used for distinguishing an optical signal to be received from optical noises and said sender's optical signal not to be received, frame generating means for generating a frame of NRZ data appended to said head leader on the head of said stored NRZ transmission data at a timing of said data detection signal, and an NRZ data end timing signal at an end of said frame of NRZ data, end data generating means for generating end data at a timing of said NRZ data end timing signal, coding means for coding said frame NRZ data to data of a differential mode inversion (DMI) code so as to obtain a DMI transmission frame appended with said END data at an end thereof, transmitting means for transmitting an optical transmission signal of the DMI code to space when said DMI transmission frame is provided, receiving means for receiving an optical receiving signal of the DMI code so as to obtain DMI receiving data appended with a head leader and end data at a head and end thereof, respectively, decoding means for decoding said DMI receiving data to data of the NRZ code so as to obtain NRZ receiving data appended with the head leader and end data at the head and end thereof, respectively, recognizing means for recognizing said NRZ receiving data from the head leader and end data for distinguishing from said sender's own optical signal not to be received and optical noises so as to obtain a recognizing signal, memorizing means for memorizing said NRZ receiving data temporarily so as to obtain memorized NRZ data on a first-in first-out basis, according to an instruction of said recognizing signal, and NRZ to Manchester converting means for converting said memorized NRZ data to data of the Manchester code so as to obtain Manchester receiving data.

8. An optical wireless communication apparatus according to claim 7, wherein said head leader includes a preamble data, in which a predetermined number of "1s" continue in sequence, a flag, a group address, an inner group address for identifying the sender and a cyclic redundancy check (CRC) code for detecting and correcting errors.

9. An optical wireless communication apparatus according to claim 7, wherein said recognizing signal of the recognizing means can not be obtained when said sender's optical signal is detected in said head leader.

10. An optical wireless communication apparatus according to claim 8, wherein said recognizing signal of the recognizing means can be obtained only when said sender's group address is detectable and said sender's inner group address is undetectable in said head leader.

11. An optical wireless communication apparatus according to claim 7, wherein said end data of the end data generating means consists of two cycles of square waves having a cycle time of four times as long as a shortest cycle time of a data signal of said DMI transmission frame of the coding means.

12. An optical wireless communication apparatus according to claim 8, wherein said recognizing signal of the recognizing means instructs the memorizing means not to memorize said NRZ receiving data when an error signal is detected by using the CRC code.

13. An optical wireless communication apparatus according to claim 7, wherein connecting means for connecting said transmission data of the Manchester code to NRZ converting means and said Manchester receiving data to a transmission line transmitting data of the Manchester code via an input-output interface is included.

\* \* \* \* \*

UNITED STATES PATENT AND TRADEMARK OFFICE
CERTIFICATE OF CORRECTION

PATENT NO. : 5,903,369
DATED : May 11, 1999
INVENTOR(S) : Masahiro HIRAYAMA, et al.

It is certified that error appears in the above-identified patent and that said Letters Patent is hereby corrected as shown below:

On the title page, item [73], the 2nd assignee's name should read:

--ITT Cannon Co., Ltd.--

Signed and Sealed this

Eighteenth Day of April, 2000

*Attest:*

Q. TODD DICKINSON

*Attesting Officer*      *Director of Patents and Trademarks*